United States Patent [19]

Rice

[11] Patent Number: 4,848,761
[45] Date of Patent: Jul. 18, 1989

[54] WORK PIECE HOLDER AND BLADE GUARD FOR SCROLL SAW

[75] Inventor: Kristen L. Rice, Harrisonville, Mo.
[73] Assignee: Verle L. Rice, Harrisonville, Mo.
[21] Appl. No.: 190,893
[22] Filed: May 6, 1988
[51] Int. Cl.[4] .............................................. B25B 1/00
[52] U.S. Cl. .................................. 269/87.2; 269/91; 269/224; 269/286
[58] Field of Search .................. 269/87.1, 87.2, 87.3, 269/91, 286, 224; 112/151; 83/925 CC, 922

[56] References Cited

U.S. PATENT DOCUMENTS

| | | | |
|---|---|---|---|
| 1,048,720 | 12/1912 | Miller et al. | 112/151 |
| 2,003,665 | 6/1935 | Karle | 112/151 |
| 4,555,100 | 11/1985 | Ditto | 269/286 |

Primary Examiner—Robert C. Watson
Attorney, Agent, or Firm—Kokjer, Kircher, Bradley, Wharton, Bowman & Johnson

[57] ABSTRACT

The present invention relates to work piece holders for use with scroll saws having reciprocating blades. The device is made of integrally molded resinous material having a relatively low coefficient of friction. A first generally planar portion of the holder engages the work piece behind the blade and is integral with opposed forwardly projecting spaced apart feet which engage the work piece on the sides and in front of the blade. A second generally planar portion is spaced away from the first planar portion and adapted to be secured to a stationary arm of the saw. A resilient bridging section couples the first and second planar portions and has a unique ribbed construction which provides the necessary strength while still accommodating a degree of flexure relative to the rigid upper planar portion.

4 Claims, 1 Drawing Sheet

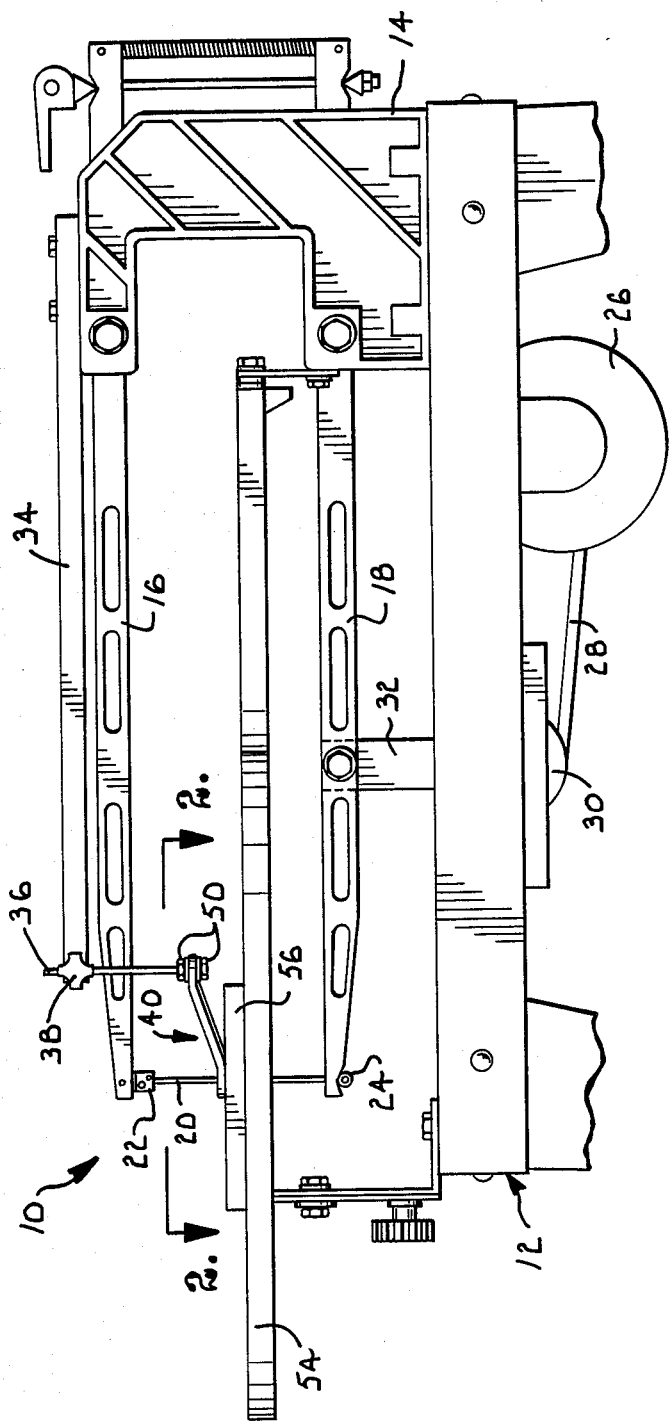
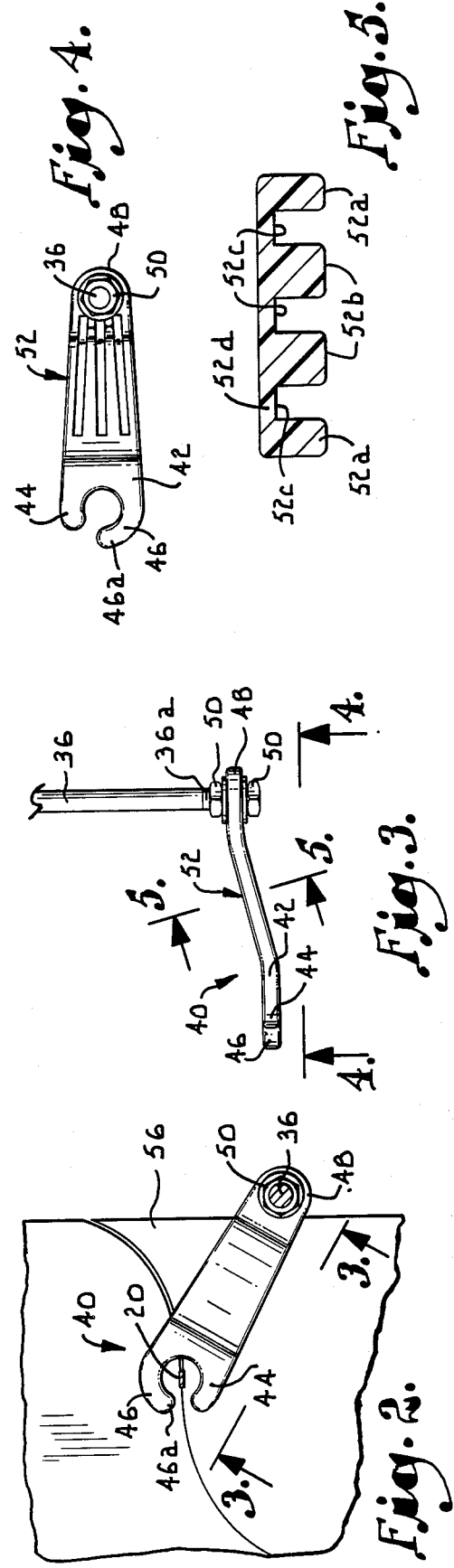

WORK PIECE HOLDER AND BLADE GUARD FOR SCROLL SAW

BACKGROUND OF THE INVENTION

This invention relates generally to precision saws and, more particularly, to a device for holding a work piece on the working surface of such a saw.

Precision saws or "scroll" saws are utilized for cutting detailed fret work and other intricate patterns in wood and plastic. The saws typically employ parallel arms which hold a fine thin blade between them. The arms are moved in tandem so as to effect the cutting action of the blade.

It is well known to provide a work piece holder which partially surrounds the blade the primary function of which is to hold the work piece being cut on the table during the upward stroke of the moving blade. The work piece holder also offers some protection for the fingers of the operator during the cutting action.

Heretofore, the work piece holders have been constructed of metal and are designed to offer minimal contact with the work piece so as to minimize the frictional resistance between the work piece and the work piece holder. The prior art holders also offer only minimal resiliency because of the metal from which they are constructed. Thus, if the piece being sawed has any variation in thickness, considerable difficulty may be encountered in guiding it beneath the holder. Also, with prior art devices because of their lack of resiliency, care must be taken in positioning the holder relative to the work piece since if the two are in too tight engagement, the holder is likely to scar the piece being sawed, particularly if it is a relatively soft wood.

The present invention overcomes the deficiencies of the prior art by providing a work piece holder of resilient material having a relatively low coefficient to friction. As a result, the area of contact between the holder and the work piece can actually be increased while decreasing the frictional resistance encountered during the sawing operation.

It is therefore a primary object of the present invention to provide a work piece holder for a precision saw which offers reduced frictional resistance between the holder and the work piece when compared with prior devices made from metal.

Another important objective of my invention is to provide a work piece holder for precision saws wherein the holder is made of relatively resilient synthetic material thus making it more suitable to accommodate variations in the thickness of the work piece without unduly increasing the resistance encountered in feeding the work piece to the saw blade.

Another important objective of my invention is to provide a work piece holder for a precision saw wherein the area of contact between the holder and the work piece is increased in comparison with prior art work piece holders, thereby reducing the possibility of scarring the work piece during the sawing operation.

Other objects of the invention will be made clear or become apparent from the following description and claims when read in light of the accompanying drawing wherein:

DETAILED DESCRIPTION OF THE INVENTION

FIG. 1 is an elevational view of a precision saw utilizing a work piece holder according to the present invention;

FIG. 2 is a horizontal cross sectional view taken along line 2—2 of FIG. 1;

FIG. 3 is a side elevational view looking in the direction of arrows 3—3 of FIG. 2;

FIG. 4 is a bottom plan view taken in the direction of arrows 4—4 of FIG. 3; and FIG. 5 is a vertical cross sectional view taken along line 5—5 of FIG. 4.

Referring initially to FIG. 1, a parallel arm precision saw is designated generally by the numeral 10 and it is mounted upon a platform table 12. Saw 10 includes a C-bracket 14 and parallel arms 16 and 18 which mount saw blade 20 utilizing upper and lower blade holders 22 and 24, respectively. The saw arms are moved by a motor 26 via a belt 28, pulley 30 and linkage 32 to the lower arm 18.

C-bracket 14 mounts a laterally extending stationary arm 34 having an opening at one end for receiving a vertical rod 36. Rod 36 is movable relative to arm 34 and is held in place by a screw (not shown) to which is secured a knob 38. Rod 36 is provided with threads 36a at the end distal from arm 34 so as to provide a mount for a work piece holder designated generally by the numeral 40. Work piece holder 40 includes a first and generally planar portion 42 and spaced apart feet 44 and 46 which are in planar alignment with portion 42. A second planar portion 48 is disposed in a plane above the first portion 42 and is provided with an aperture through which rod 36 is received. Nut and washer assemblies 50 secure holder 40 to the rod 36. An integral resilient bridging member 52 couples the two planar portions 42 and 48 together. Bridging member 52 is provided with an alternating pattern of ribs 52a and 52b which are separated by recessed channels 52c. The channels terminate before they penetrate the thickness of the member 52 so as to leave a relatively thin web of material 52d which connects adjacent ribs.

Holder 40 is preferably made of nylon or other synthetic resinous material characterized by a resiliency factor which is greater than that of steel of a corresponding thickness and a coefficient of friction when moved over steel which is appreciably less than the comparable coefficient for steel on steel.

The planar portion 42 and adjacent feet 44 and 46 are designed to provide the maximum possible contact area with the work piece, preferably at least 650 square millimeters so as to spread the downward pressure of the holder over the widest possible area thus reducing the possibility of scarring the work piece. By virtue of the fact that at least one foot 46 is provided with a curved section 46a, the foot provides the maximum possible "wrap around" configuration relative to saw blade 20. This increases the protection afforded the hands of an operator when performing a sawing operation.

The unique ribbed construction of the bridging section 52 provides for enhanced resiliency of the holder 40 without significantly reducing structural strength. The construction of bridging member 52 so as to provide recesses 52c also minimizes the quantity of material utilized in molding holder 40 into an integral piece.

Notwithstanding the fact that feet 44 and 46 together with planar portion 42 present an area for contacting a work piece which is significantly larger than the area of contact with prior art devices, the frictional resistance between the holder and the work piece is reduced because of the unique construction of the holder.

Referring again to FIG. 1, operation of the device according to the present invention will be explained. A working table 54 which is a part of saw 10 provides a surface for a work piece such as a block of wood 56. Holder 40 is lowered into contact with the upper surface of the work piece and is then secured in this position by tightening knob 38. The holder will assure that the work piece remains on table 54 during upward movement of saw blade 20 and the resilient nature of the holder will allow it to accommodate slight variations in thickness of wood block 56 without increasing the resistance between the block and the holder to such an extent that it becomes difficult to move the block beneath the holder.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A device for holding a work piece on the table of a saw having a reciprocating blade, said device comprising:
    a first generally planar portion for engaging said work piece behind said blade and opposed forwardly projecting spaced apart feet for engaging said work piece on the sides of the blade, at least one of said feet having a curved section extending toward the opposite foot;
    a second generally planar portion spaced away from said first planar portion and adapted to be secured to said saw; and
    resilient means coupling said second portion with said first portion at a plane above the plane of said first portion.

2. A device as set forth in claim 1, wherein said first generally planar portion and said feet comprise an area of at least 650 square millimeters for contact with said work piece.

3. A device as set forth in claim 1, wherein said first planar portion is characterized by a coefficient of friction when moved relative to a work piece which is less than the coefficient of friction of steel when moved relative to the same work piece.

4. A device as set forth in claim 2, wherein said planar portions and said resilient means are integrally molded.

* * * * *